June 3, 1941.  A. F. ANDERSON  2,244,479
ANTISWIRL DEVICE
Filed Nov. 18, 1940  3 Sheets-Sheet 1

INVENTOR.
A.F. ANDERSON
BY
Martin E. Anderson
ATTORNEY.

June 3, 1941.  A. F. ANDERSON  2,244,479
ANTISWIRL DEVICE
Filed Nov. 18, 1940  3 Sheets-Sheet 2

INVENTOR.
A. F. ANDERSON
BY Martin E. Anderson
ATTORNEY.

June 3, 1941.  A. F. ANDERSON  2,244,479
ANTISWIRL DEVICE
Filed Nov. 18, 1940  3 Sheets-Sheet 3

INVENTOR.
A. F. ANDERSON
BY
Martin E. Anderson
ATTORNEY

Patented June 3, 1941

2,244,479

UNITED STATES PATENT OFFICE 2,244,479

ANTISWIRL DEVICE

Albert F. Anderson, San Francisco, Calif.

Application November 18, 1940, Serial No. 366,098

8 Claims. (Cl. 253—117)

This invention relates to improvements in hydraulic turbines and has reference to an improved means for increasing the efficiency and effecting a better speed regulation.

It is well understood that hydraulic turbines in which the runner is positioned over and discharges the water into the upper end of a draft tube, the water discharged will at times form vortices or whirls in the draft tube which interfere with the free flow of the water and "choke" the discharge. The formation of whirls at frequent intervals interferes with the speed regulation and when a turbine drives an electric generator, these variations in speed cause power swings or surges in the transmission lines.

When a turbine is operating normally, the water will leave the runner axially and under such conditions the water will not form vortices or whirls within the draft tube. When the turbine is overloaded, the water will be discharged helically in one direction and when it is operating at less than normal load, the water will be discharged helically in the other direction. The helical discharge of the water causes it to form whirls and high velocity swirls within the draft tube which choke the flow and momentarily reduce the speed of the runner. Such swirls and chokes follow each other in rapid succession and are objectionable.

Since the conditions of operation are seldom ideal the water in the draft tube is nearly always in a state of swirl, but if the swirling motion is not too great, it is not particularly objectionable. When the swirl becomes excessive, they effect the speed of the runner and unless checked interfere greatly with its operation.

In order to remedy the difficulty and to retard the formation of violent swirls stationary vanes or baffles have been welded or otherwise secured to the inside of the draft tube. Such fixed vanes, however, detract from the efficiency of the turbine because of the violent turbulence they cause; they also give rise to destructive cavitation which causes serious damage by pitting the metal.

It is the object of this invention to produce a simple and efficient means for limiting the formation of swirls to such an extent that they will not interfere with the satisfactory operation and which, at the same time, will prevent cavitation.

This invention, briefly described, consists in substituting for the fixed vanes or cleats now commonly employed to overcome swirls and surges in the draft tubes of hydraulic turbines, a yieldingly mounted vane that extends radially inwardly from the inner surface of the draft tube and which can turn about a pivot that extends radially with respect to the center of the draft tube. This vane is so positioned with respect to the pivot that the greater surface area is positioned below the pivot and it will therefore tend to adjust itself parallel to the flow of the water. In order to prevent the vane from moving to a position in which it would be ineffective, means such as springs or weights are provided which oppose a yielding force to the movement of the vane from its neutral position. This force is produced by means of such construction that the resisting action will increase in proportion to the vanes movement from a neutral position in either direction.

Since a moderate amount of swirl is permissible, the vane is so constructed and adjusted that it does not begin to appreciably oppose the whirling motion until it approaches a degree of violence that is objectionable. The position of the vane any place within the arcuate zone of permissible variation will be referred to as the neutral position of the vane. In Fig. 1 the limits of this zone have been indicated in a general way by the broken line positions of the vane.

Having thus briefly described the invention and its objects, the invention will now be described in detail and for this purpose reference will be had to the accompanying drawings in which the invention has been illustrated in its preferred form, and in which.

Figure 1:
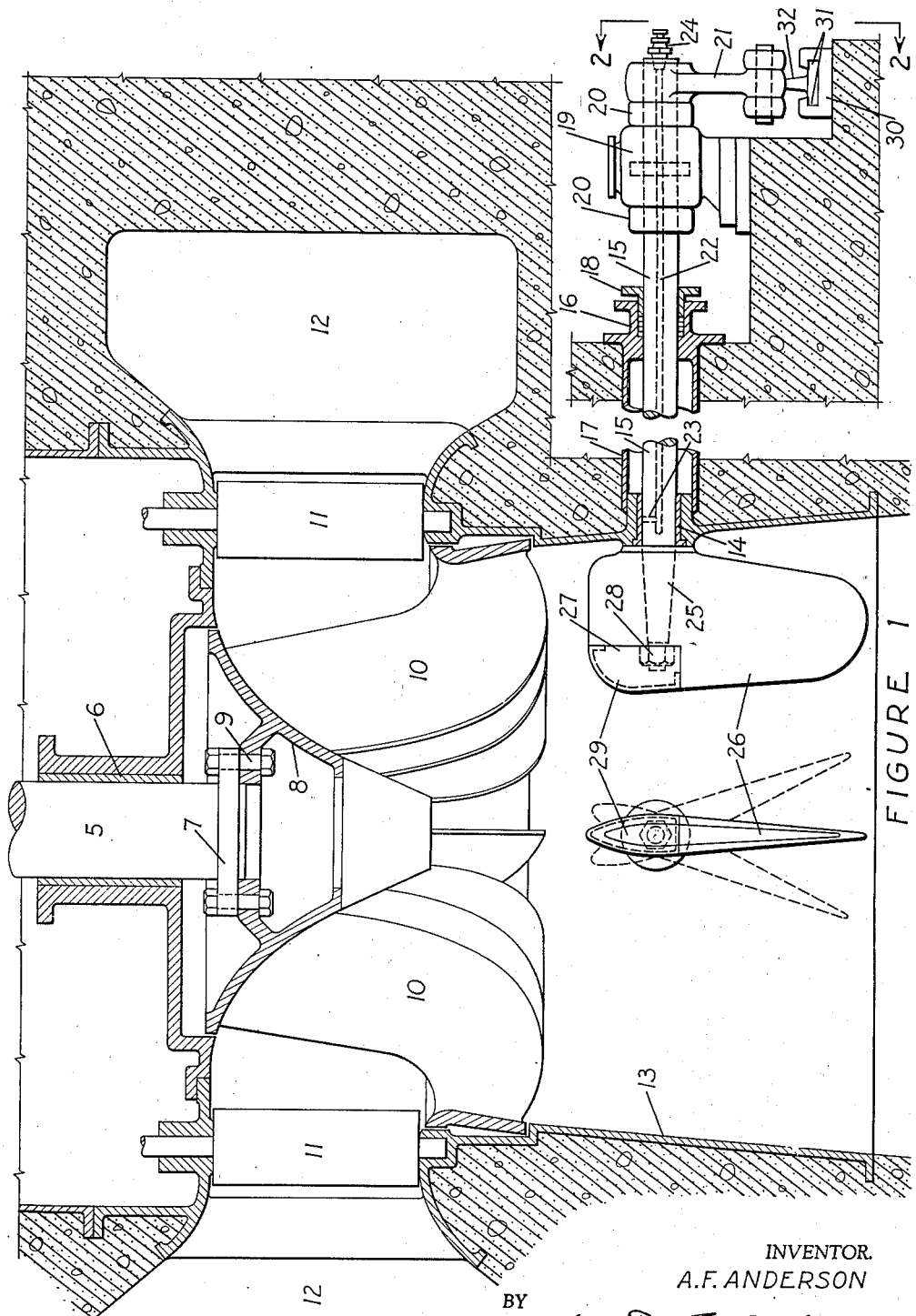
Figure 1 is a diametrical section through a turbine and its mounting and shows the position of the runner with respect to the draft tube and also shows the pivotally mounted vane in its relation to the other parts.

Referring now to the drawings, reference numeral 5 designates the runner shaft of a hydraulic turbine. This shaft is mounted for rotation in a bearing 6 and is provided at its lower end with a flange 7 to which the runner 8 is attached by means of bolts 9. The runner is provided with a plurality of buckets 10 and is surrounded by movable guides 11 which are adjusted by means of a governor, not shown, to control the speed and power output. The water enters through the annular chamber 12, which is connected with the reservoir.

Since the construction of the turbine is old and well known, it will not be described to any greater extent than necessary to explain the invention to which this application relates.

The runner 8 is positioned at the upper end of a draft tube whose wall has been designated by reference numeral 13. The lower end of the draft tube is connected with an elbow tube that has not been shown.

In the form illustrated, the runner rotates in such a direction that the buckets on the right of the shaft 5 moves away from the observer, while those at the left approach. Turbines of the type illustrated are so constructed that when the conditions under which they are operating are ideal, the water, as it leaves the buckets, will be discharged downwardly in a direction parallel to the axis of rotation. Such ideal conditions seldom prevail with the result that the water is discharged in a helical direction and therefore tends to set up swirls and to form vortices within the draft tube. If the inner surface of the draft tube is circular and perfectly smooth, the violence of the swirls assumes great proportions and as a result of this, the outward flow of the water is interfered with, thereby producing a choking action that reduces the power output of the turbine and causes it to slow down when loaded. Such chokes or swirls persist only for short intervals of time and after each choking action, the water rushes out through the draft and suction tubes, whereupon the velocity of the water flowing through the turbine is again increased with the result that the speed of the runner also increases. Under certain conditions, this periodic variation in speed, due to the swirls in the draft tube, become very objectionable and when the turbine is driving an electric generator power swings are produced in the transmission lines which may become of sufficient intensity to make them dangerous.

The loss of efficiency and regulation due to the production of swirls in the draft tube have been recognized and in an effort to diminish their effect, and if possible to prevent their formation it has been suggested that one or more cleats or vanes be rigidly attached to the inner surface of the draft tube. When such stationary vanes are used, they are effective to some extent in reducing the intensity of the swirls, but they also produce an excessive turbulence of the water as it passes over the vanes or cleats which results in cavitation or destructive pitting of the metal parts. The nonmovable vanes or cleats detract from the efficiency of the turbine because of the violent turbulence they introduce and therefore the advantage gained is to a great extent offset by the production of this turbulence.

This invention relates to the use of pivotally mounted vanes in place of the stationary vanes or cleats above referred to.

If the swirling of the water within the draft tube does not exceed a predetermined amount of violence, it is not particularly objectionable and therefore in accordance with the present invention, the vane or vanes are so mounted that they can move quite freely about their pivots within certain angles, but if the force tends to move them beyond this angular relation, such movement is resisted by powerful means.

Referring now to the drawings, it will be observed that the wall of the draft tube is provided with one or more bearings 14 in which shafts 15 are mounted for limited rotation. In the embodiment shown two bearings have been illustrated but any suitable number may be provided, preferably four. Bearing 14 is connected with an outer bearing 16 by means of a tubular member 17. The distance between the bearings 14 and 15 depends upon the design and size of the turbine. Bearing 16 is provided with a gland 18 which prevents water from seeping through between the shaft and the bearing surface. Shaft 15 extends outwardly and is journaled in a bearing 19 and is provided with collars 20 which resist any thrust forces. Secured to the outer end of shaft 15 is a crank arm 21. The shaft is provided with a central opening 22 which is in communication with the inner surface of bearing 14 by means of a radial opening 23. A lubricating fitting 24 is attached to the outer end of the shaft so that the bearing 14 may be lubricated by means of some suitable pressure lubricating device. The inner end of shaft 15 is tapered as indicated by reference numeral 25 and extends through a correspondingly tapered opening in vane 26. The vane has a cut-out portion 27 for the reception of the nut 28 and this cut-out is normally closed by means of a cover 29 which is held in place by any suitable means and may be spot welded to the vane. It will be observed from Figure 1 that the vane 26 is streamlined and that the opening for the reception of the tapered end 25 of the shaft is nearer the upper end than the lower end. With the construction shown, the greater portion of the surface of the vane is positioned below the axis of shaft 15 and it will therefore be unbalanced and will tend to align itself with the direction of the water flowing through the draft tube.

In Figure 1, two dotted line positions of the vane have been shown and these indicate the permissible variation in the angular flow of the water and within these limits the vane opposes very little resistance to the swirling action.

Figure 2:
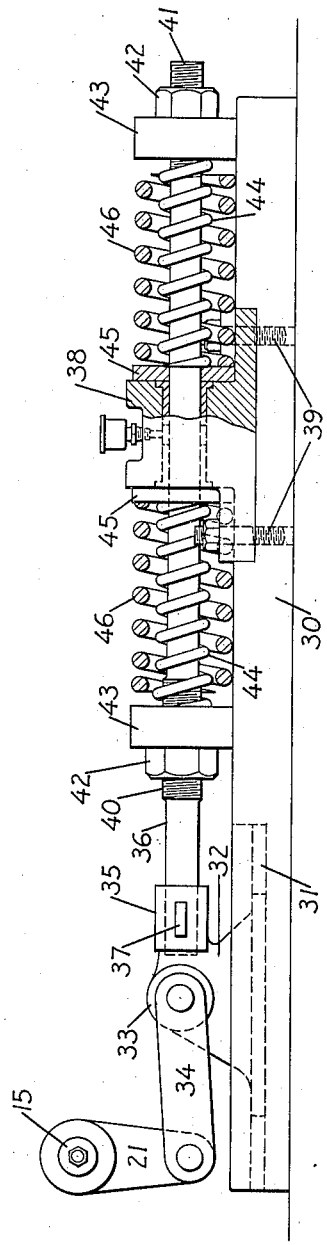
Figure 2 is a view looking in the direction of arrows 2—2, Figure 1 and illustrates one means for resiliently opposing the movement of the vane from a neutral position and for returning it to the neutral position.

Referring now to Figure 2, reference numeral 30 designates a base which is provided at one end with slots 31 in which a cross head 32 is slidable. The cross head is provided with a bearing 33 that is connected with the movable end of the crank arm 21 by means of connecting rods 34. Bearing 33 is provided with a forwardly extending socket 35 for the reception of one end of rod 36. The socket and the rod are both provided with rectangular openings for the reception of a key 37 that serves to connect the rod 36 with the cross head. When the parts are to be detached, the key can be readily removed thereby, permitting the rod 36 with its attached parts to be separated from the base. A bearing 38 is secured to the base by means of bolts 39 and rod 36 is slidably mounted in this bearing as shown. Rod 36 has a threaded portion 40 and another threaded portion 41. Nuts 42 cooperate with the threaded portions and engage thick washers 43 that form abutments for springs 44. The other ends of springs 44 abut the washers 45. Springs 44 are comparatively weak and their main function is to prevent the vane 26 from chattering during the times when the angular displacement of the vane is within the limits indicated by the dotted line positions in Figure 1. Surrounding the rod 36 are two heavier springs which have been designated by reference numerals 46. These heavier springs are shorter than the lighter springs 44 and do not engage the abutments 43 when the vane is in normal or neutral position. It will be evident that whenever the vane is turned about the axis of shaft 15, it will rotate the latter and move the crank arm 21, whereupon one of the springs 44 will be compressed. If this rotary movement continues, the corresponding abutment 43 will engage the adjacent end of the corresponding spring 46 thereupon interposing a greater resistance to turning. Since this resistance is provided by means of springs, it will increase in proportion to the angular rotation of the vane. The amount of resistance for a given angular rotation of a vane can be varied by adjusting the positions of nuts 42.

Figures 3, 4:
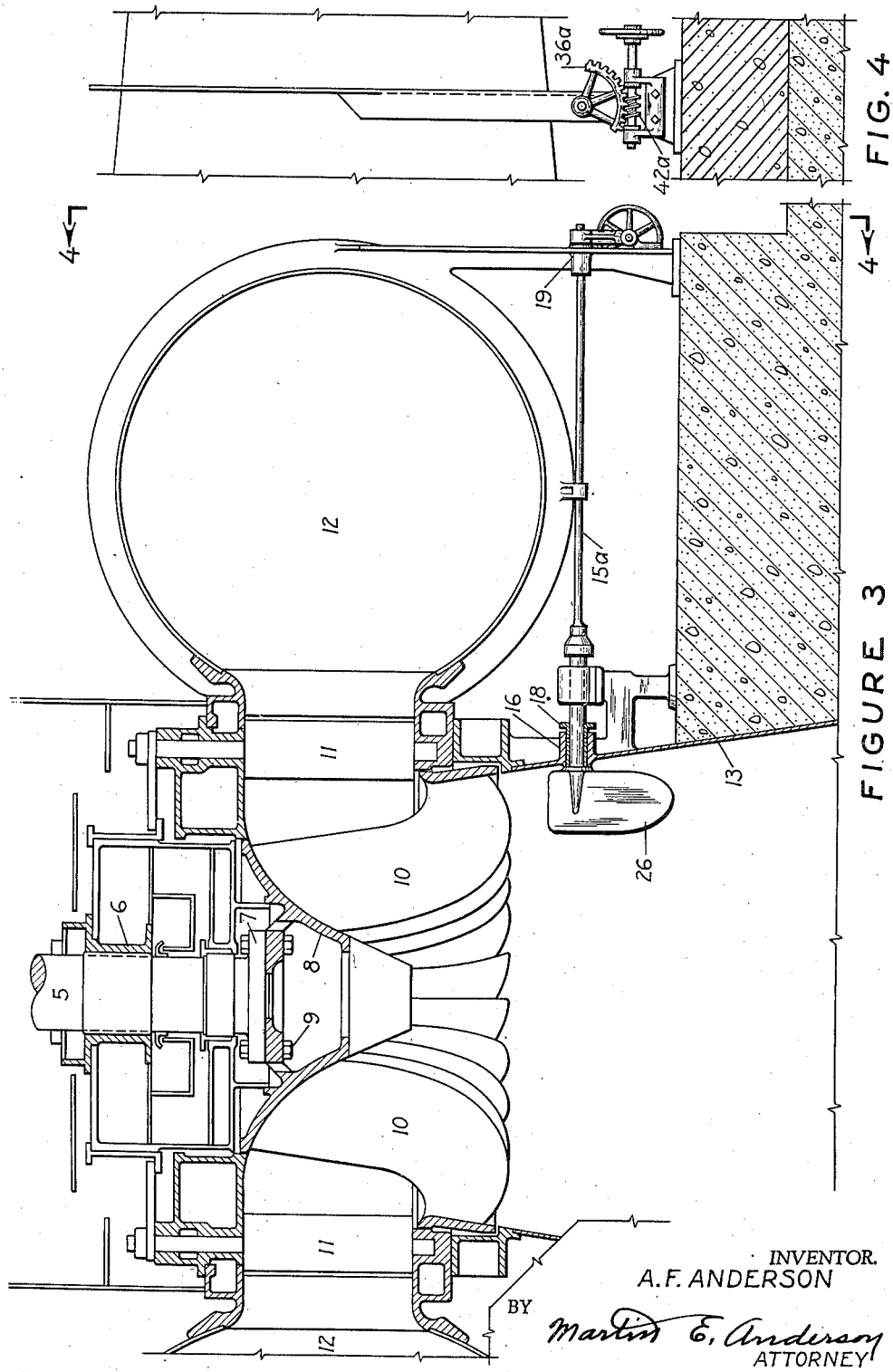
Figure 3 is a view similar to that shown in Figure 1 and shows a slightly modified embodiment.
Figure 4 is a section taken on line 4—4, Figure 3.

The arrangement illustrated in Figure 2 is believed to be very well suited for the purpose under consideration, but it is to be understood that it is merely illustrative. The resistance afforded by this mechanism can be attained by other mechanical equivalents, among which may be mentioned the torsional resistance of shaft 15. In Figures 3 and 4 a construction is shown in which the torque of the resilient shaft is depended on to resist the turning of vane 26. In this embodiment shaft 15 has been replaced by shaft 15a which has a diameter somewhat less than shaft 15 in proportion to its length. Such a shaft will permit a limited twisting in either direction and so long as this does not exceed the elastic limit the shaft will return to its original position. The rotary adjustment which is effected by means of the nuts 42 in Figure 2 is here effected by the segmental worm gear 36a and the worm 42a. It will be observed that in both embodiments the resisting force increases with the angular displacement of the vane from its normal position.

Let us now assume that the turbine is operating and discharging water into the draft tube. If conditions are ideal, the water will leave the runner in a direction parallel with the axis of rotation, but since such ideal conditions are very seldom present, the water will leave the runner in an angular direction which will cause it to flow helically through the draft tube. If this helical flow or swirl is comparatively small, the vane or vanes will oppose very little resistance, but will merely turn about their pivots so as to point in the direction from which the currents come. If the swirl increases so as to move the vane beyond the angles indicated by the dotted lines, the large spring 46 will be put under compression and any further movement of the vane will be opposed with an increasing force. The vane will now serve to retard the swirl and will prevent the swirling or vortex action increasing to such an extent as to interfere with the successful regulation of the turbine. Due to a streamlining of the vane and to the fact that it is movable, the turbulence set up by it will be less than it would be with immovable vanes and therefore cavitation and pitting of the metal is prevented.

The number of vanes necessary for any given installation may differ from that of other installations and therefore the draft tube is preferably provided with four bearings 14, any or all of which may be utilized. Those that are not used may be plugged so as to be available if more vanes are found to be necessary. By having the vanes removably attached to the inner ends of the shafts, the latter can be removed quite readily by first detaching the vane. Since the shaft 15 is quite long and made of resilient material, it is evident that it will be twisted to some extent by the force supplied to the vanes and this eliminates vibration at the crank end of the shaft. By extending the shaft 15 and supporting it in two spaced bearings 14 and 15, the parts shown in Figure 2 may be positioned so as to be conveniently accessible for repairs and adjustments.

Having described the invention what is claimed as new is:

1. In a turbine having a draft tube and a runner positioned above the draft tube, the wall of the draft tube having an opening, forming a bearing, a shaft having one end journaled in the bearing, a self adjusting swirl preventing vane positioned in the draft tube and attached to the shaft, resilient means operatively associated with the vane and shaft for resisting the action of forces produced by the action of the water on the vane, tending to move the vane from a neutral position, the vane having the greater portion of its area below the axis of the shaft whereby it will turn in response to the action of water discharged from the runner of the turbine.

2. In a turbine having a draft tube and a runner positioned above the draft tube, an anti-swirl device positioned in the draft tube, said device comprising a vane mounted on the outer wall of the draft tube for movement about a pivot substantially radial with respect to the axis of the draft tube, the vane having the greater portion of its area below the pivot whereby it will respond to the direction of water currents, and means for applying to the vane a resilient yielding force tending to oppose its movement away from and to return it to a neutral position.

3. In a turbine having a draft tube and a runner positioned above the draft tube and positioned to discharge water therein, means for limiting the production of swirls in the draft tube comprising an elongated vane mounted for movement about a pivot secured to the outer wall of and extending substantially radially with respect to the axis of the draft tube, the pivot being nearer the top of the vane than the bottom whereby the vane will tend to rotate about the pivot in response to water currents, and resilient yielding means connected with the vane for resisting forces tending to move it from a neutral position and assist in returning it to its neutral position when the deflecting force is removed.

4. In a turbine having a draft tube and a runner positioned above and discharging water into the draft tube, means carried by the draft tube for retarding the production of swirls therein, said means comprising a shaft having one end positioned within the draft tube, the wall of the draft tube having a radial opening through which the shaft extends, a bearing for the shaft, a vane attached to the end of the shaft within the draft tube, the vane being normally positioned with its plane substantially parallel to the axis of the draft tube, the connection of the vane to the shaft being at a point nearer the top than the bottom of the vane whereby it will tend to adjust its position to conform to the direction of water currents, and resilient means operatively connected with the vane for resisting the action of forces tending to turn the vane about its pivot away from a predetermined normal position.

5. In a turbine having a draft tube and a runner positioned above the draft tube for discharging water thereinto, means carried by the draft tube for retarding the production of swirls therein, said means comprising a shaft having one end positioned within the draft tube, the draft tube having a radial opening through which the shaft extends, a bearing for the outer end of the shaft, a vane attached to the end of the shaft within the draft tube, the vane being normally positioned with its plane substantially parallel to the axis of the tube, the connection of the vane to the shaft being at a point nearer the top than the bottom of the vane, a crank attached to the outer end of the shaft and means operatively connected with the crank for exerting thereon a resilient force for resisting forces tending to turn the vane about its pivot away from a predetermined neutral position.

6. In a turbine having a vertical draft tube above which a runner is positioned for discharging water thereinto, means for retarding and limiting the formation of swirls within the draft tube, said means comprising a shaft extending through an opening in the wall of the draft tube, a vane attached to the inner end of the shaft, the vane having the greater portion of its total area below the axis of the shaft, two spaced shaft bearings one of which is attached to the draft tube, a crank arm attached to the outer end of the shaft, a base, a crosshead slidably connected therewith a connecting rod joining the end of the crank arm to the crosshead, a bearing block attached to the base, a rod slidably mounted in the bearing block, one end of the rod being connected with the crosshead, the rod having an adjustable abutment on each side of the bearing block and a helical spring positioned on the rod between the bearing block and each abutment whereby when the shaft is turned in either direction, one of the springs will be compressed thereby opposing a yielding resilient force to forces tending to rotate the shaft in either direction.

7. In a turbine having a draft tube and a runner positioned to discharge water into the upper end of the draft tube, a self adjusting swirl preventing vane positioned in the draft tube, two spaced bearings one of which is positioned in an opening in the wall of the draft tube and a second bearing spaced from the first bearing, a shaft mounted in the bearings, one end of the shaft projecting into the draft tube, the swirl preventing vane being attached to the end of the shaft, the vane having the greater portion of its area below its point of connection to the shaft, and resilient means operatively associated with the vane for resisting the action of forces tending to turn the vane about the axis of the shaft away from a normal position and to assist in moving it towards normal position when the deflecting forces terminate.

8. In a turbine having a draft tube, and a runner positioned to discharge water downwardly thereinto, a shaft extending radially through the wall of the draft tube, an elongated vane positioned in the draft tube and secured to the inner end of the shaft, the vane having the greater portion of its area below its point of attachment to the shaft whereby it will turn in response to the direction of water currents, and resilient yielding means operatively associated with the vane and shaft for resisting forces tending to rotate the vane about the axis of the shaft, said means being arranged to oppose a resisting force that varies directly with the angular displacement of the vane from its normal position.

ALBERT F. ANDERSON.